United States Patent
Saha et al.

(10) Patent No.: US 8,834,146 B2
(45) Date of Patent: Sep. 16, 2014

(54) SYSTEM FOR PASSIVE ALIGNMENT OF SURFACES

(71) Applicant: Massachusetts Institute of Technology, Cambridge, MA (US)

(72) Inventors: Sourabh Kumar Saha, Cambridge, MA (US); Martin L. Culpepper, Rowley, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 243 days.

(21) Appl. No.: 13/658,903

(22) Filed: Oct. 24, 2012

(65) Prior Publication Data

US 2014/0113019 A1    Apr. 24, 2014

(51) Int. Cl.
*B29C 59/00*    (2006.01)

(52) U.S. Cl.
USPC .......................................... 425/385; 425/150

(58) Field of Classification Search
USPC ................................. 425/138, 385
See application file for complete search history.

(56) References Cited

U.S. PATENT DOCUMENTS

| | | |
|---|---|---|
| 5,042,709 A | 8/1991 | Cina |
| 5,993,189 A | 11/1999 | Mueller |
| 6,146,912 A | 11/2000 | Tighe |
| 6,482,742 B1 | 11/2002 | Chou |
| 6,916,585 B2 | 7/2005 | Sreenivasan |
| 7,070,405 B2 | 7/2006 | Sreenivasan |
| 7,162,810 B2 | 1/2007 | Biggs et al. |
| 7,204,686 B2 | 4/2007 | Chung |
| 7,418,902 B2 | 9/2008 | Kruijt-Stegeman |
| 7,837,907 B2 | 11/2010 | Nimmakayala et al. |
| 2003/0234465 A1* | 12/2003 | Chen et al. ............... 264/108 |
| 2006/0032070 A1* | 2/2006 | Biggs et al. ............... 33/645 |
| 2008/0213418 A1* | 9/2008 | Tan et al. .................. 425/112 |
| 2010/0116161 A1 | 5/2010 | Shilpiekandula |
| 2011/0037488 A1 | 2/2011 | Shilpiekandula |

* cited by examiner

*Primary Examiner* — Ryan Ochylski
(74) *Attorney, Agent, or Firm* — Sam Pasternack; MIT Technology Licensing Office

(57) ABSTRACT

Passive stamp alignment system. The system includes a stamp supported by a stamp holder resting on three balls affixed to a top platform. A bottom platform supports a substrate to be aligned with the stamp. Means are provided for moving either the top or the bottom platform and holding the other platform stationary so as to contact the substrate with the stamp whereby the stamp holder is lifted away from each of the balls in sequence resulting in alignment of the stamp and the substrate parallel to each other.

10 Claims, 6 Drawing Sheets

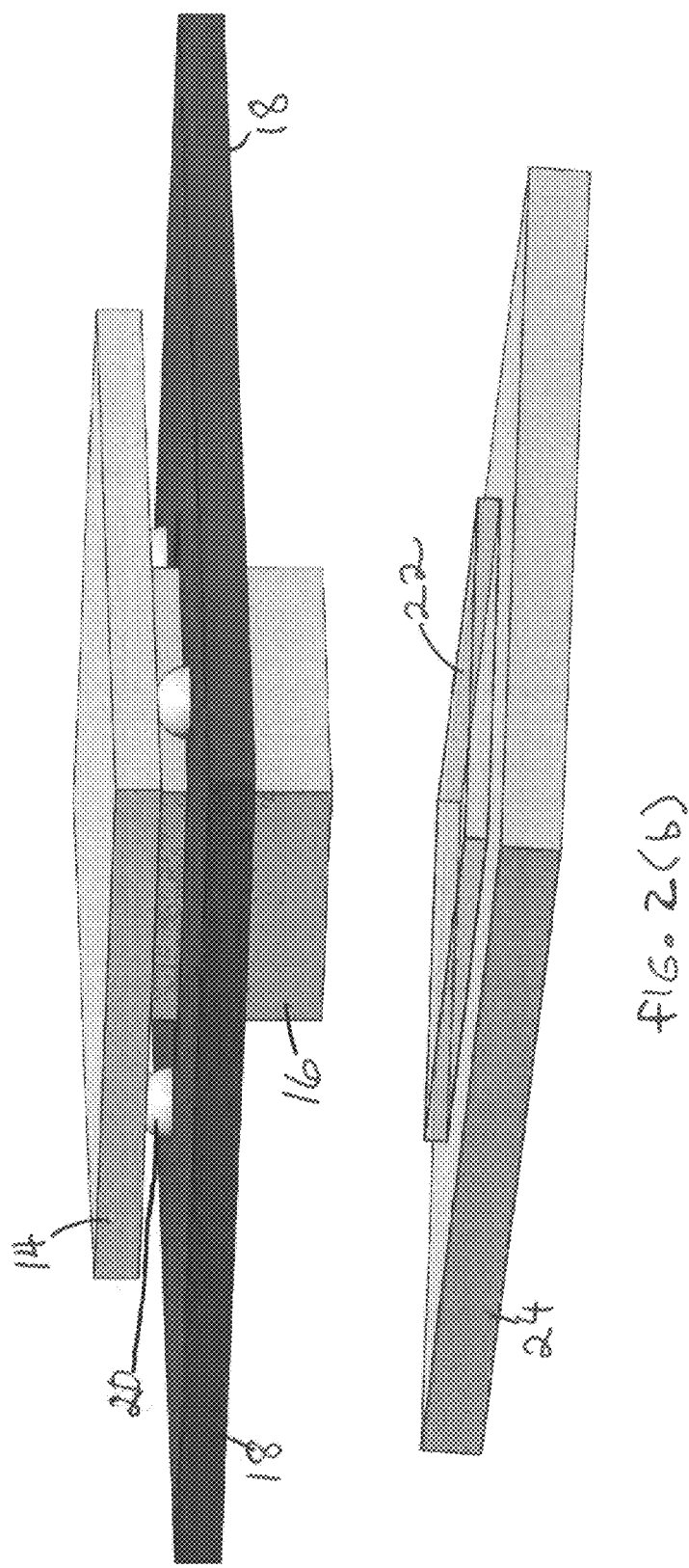

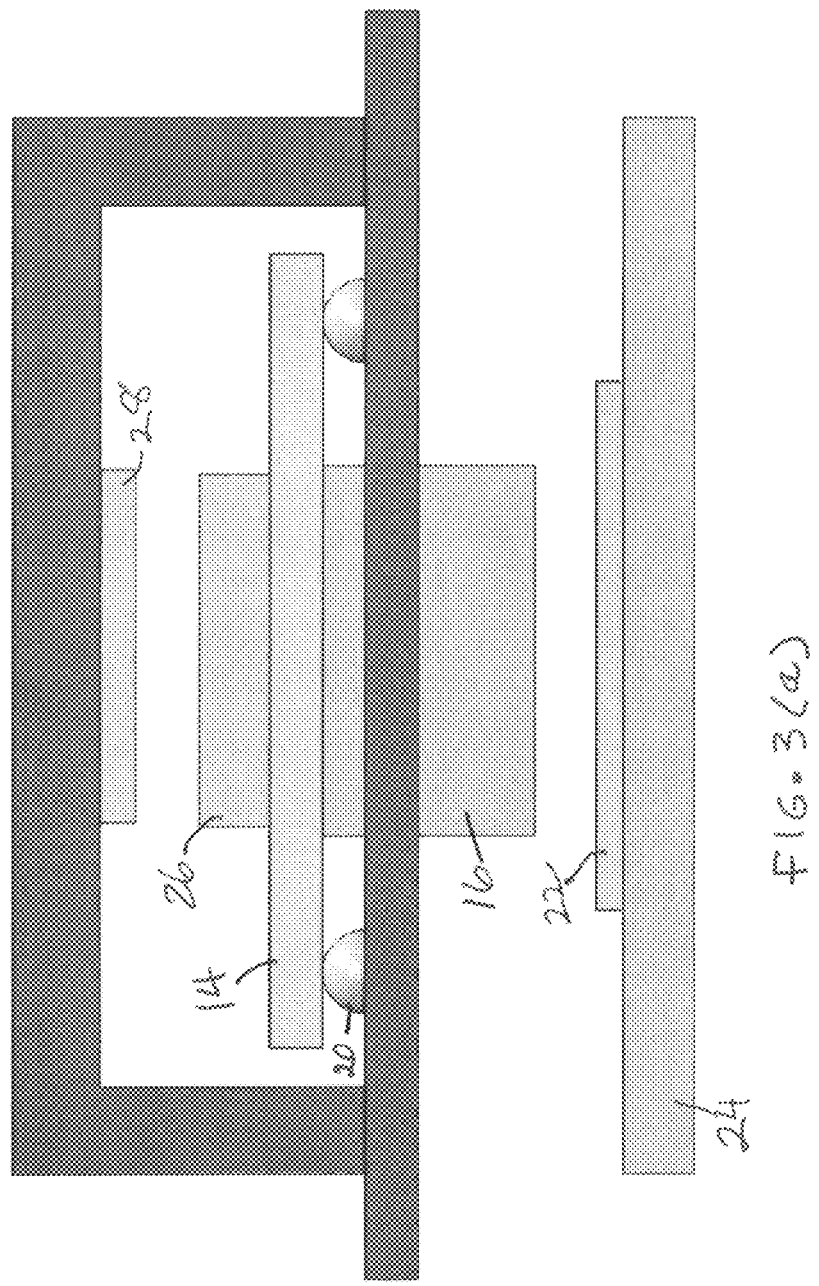

SYSTEM FOR PASSIVE ALIGNMENT OF SURFACES

This invention was made with government support under Grant No. EEC0914790 awarded by the National Science Foundation. The government has certain rights in this invention.

BACKGROUND OF THE INVENTION

This invention relates to an alignment system and more particularly to such a system for aligning a stamp/template parallel to a substrate surface for conformal contact.

Temporarily bringing two surfaces into physical contact with each other is required during several manufacturing processes. For example, during imprinting-based transfer of patterns from a stamp/template onto a substrate surface, the template must make conformal contact with the substrate. Conformal contact means that the entire surface of the template is in contact with the substrate; this contact ensures that pattern transfer is successful over the entire surface of the template. Conformal contact is hindered, however, by the initial angular misalignment between surfaces. This initial angular misalignment is illustrated in FIGS. 1(a) and 1(b). Note that stamp 10 is misaligned by angles $\theta_x$ and $\theta_y$ with a glass slide 12 so that the two surfaces are initially not parallel to each other. FIGS. 1(c) and 1(d) show front and side views after the stamp 10 and slide 12 are aligned by the method of the invention disclosed herein.

When soft/deformable templates are used, conformal contact may be achieved by compressing the template onto the substrate. However, this technique is not appropriate when the template contains fragile features that are susceptible to damage at high contact forces. An example of fragile features susceptible to damage includes DNA or metallic nanowires. Thus, to ensure conformal contact between such fragile surfaces one must (i) align the surfaces parallel to each other and (ii) maintain the contact forces below a threshold value. Although high precision stages are available for actively aligning surfaces at low contact forces, these stages are impractical for adoption in a manufacturing system because of their higher costs.

Currently available alignment stages can be divided broadly into two types based on their motion control system: (i) active alignment systems that use force and/or displacement feedback to perform alignment and (ii) passive systems that rely on the compliance of a soft/deformable stamp to achieve conformal contact. A six-axis nanopositioning motion stage is an example of an active system. A manual contact printing technique is an example of a passive system.

The advantage of an active alignment system is that fragile surfaces can be reliably aligned at low contact forces. However, such systems are difficult to scale-up due to the expensive, complex, and bulky sensors and actuators that are required for feedback motion control. This limitation is particularly critical when the templates are much smaller than the alignment system. For example, for biomedical applications it is more desirable to imprint-individual stamps/templates of size approximately 1 cm² than to dice-up a large 6-8 inch wafer into smaller chips after imprinting. Scale-up would then involve introducing a precision stage of size approximately a few cubic feet for each stamp. This implementation is not practical for a manufacturing environment.

The advantage of a passive alignment scheme is that it eliminates the need for expensive sensors and actuators that are necessary for feedback control of an active motion system. Such passive alignment reduces the cost, complexity and size of the alignment, system. Although passive alignment may be easily achieved by manually guiding the surfaces to be aligned, such schemes have limited capability to provide a predetermined repeatable motion and to restrict the contact forces during alignment. In this case, conformal contact is achieved via compression/deformation of the template and relies on the compliance of the template. Thus, such systems are not appropriate for aligning surfaces that have fragile micro- and nano-scale features that may be damaged at high contact forces.

The present invention has particular application to imprinting of DNA nanowires. Details of such an application are found in "An Automated Stage for Scalable Imprinting of DNA Nanowires Based on a Self-aligning Technique," Proc. ASME IMECE2012, the contents of which are incorporated herein by reference.

It is an object of the present invention to provide a tool to passively align two initially misaligned planar surfaces parallel to each other such that conformal contact is achieved and the contact forces are low. The passive alignment scheme according to the invention eliminates the need for expensive sensors and actuators for a motion system thereby lowering the cost of the alignment process by a factor of approximately one-hundred. The cost savings make it economical to adopt the present invention for large scale imprinting-based manufacturing.

SUMMARY OF THE INVENTION

The passive stamp alignment system according to the invention includes a stamp supported by a stamp holder resting on three balls fixed to a top platform such that the stamp extends below the top platform. A bottom platform located below the stamp supports the substrate to be aligned with the stamp. Means are provided for moving either the top or the bottom platform and holding the other platform stationary so as to contact the substrate with the stamp whereby the stamp holder is lifted away from each of the balls in sequence resulting in alignment of the stamp and the substrate parallel to each other.

In a preferred embodiment of the invention the stamp extends below the top platform through a slot in the platform. The substrate may be a glass slide. The stamp may include a pattern of DNA nanowires to be replicated.

BRIEF DESCRIPTION OF THE DRAWING

FIGS. 2(a) and 2(b) are schematic illustrations of an embodiment of the passive alignment tool disclosed herein.

FIGS. 3(a) and 3(b) are side and perspective views, respectively, of an embodiment of the invention using magnets to tune the contact force.

DESCRIPTION OF THE PREFERRED EMBODIMENT

Figure 1A:
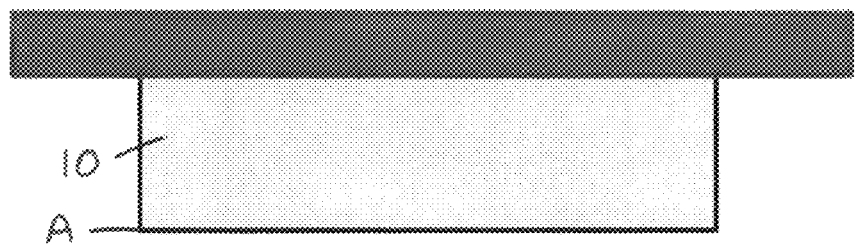
FIGS. 1(a) and 1(b) are schematic illustrations showing front and side views of a misaligned stamp and slide.
Figure 1A:
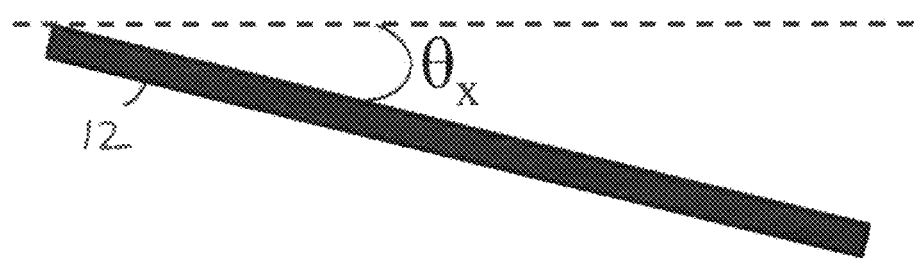
Figure 1B:
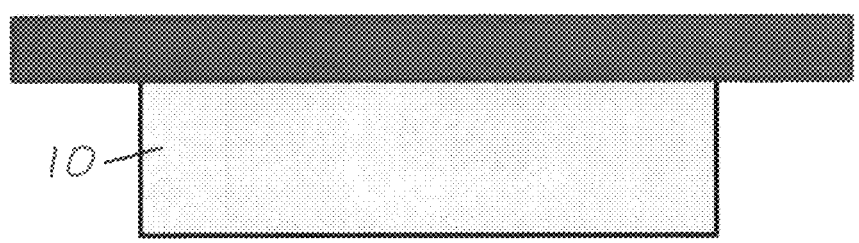
Figure 1B:
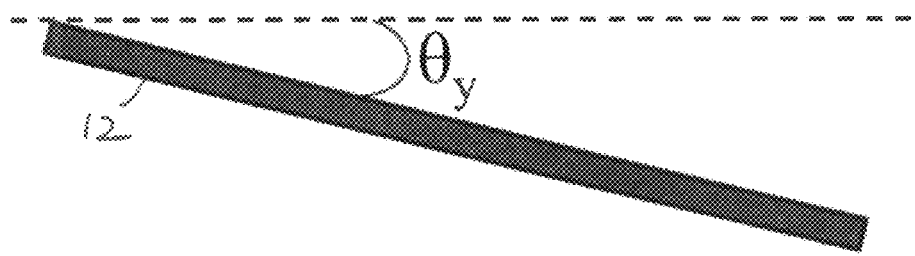
Figure 1C:
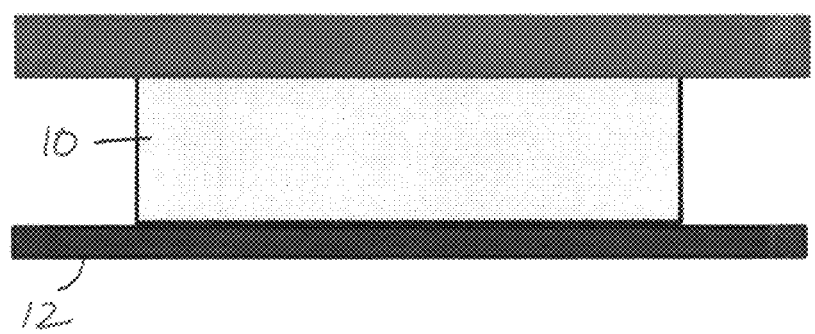
FIGS. 1(c) and 1(d) are schematic illustrations of front and side views of finally aligned stamp and slide.
Figure 1D:
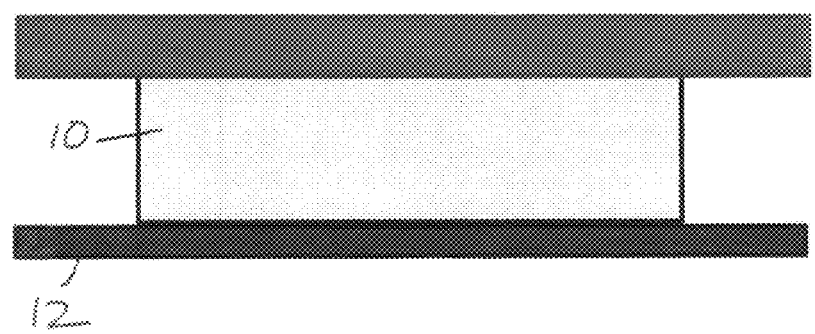
Figure 2A:
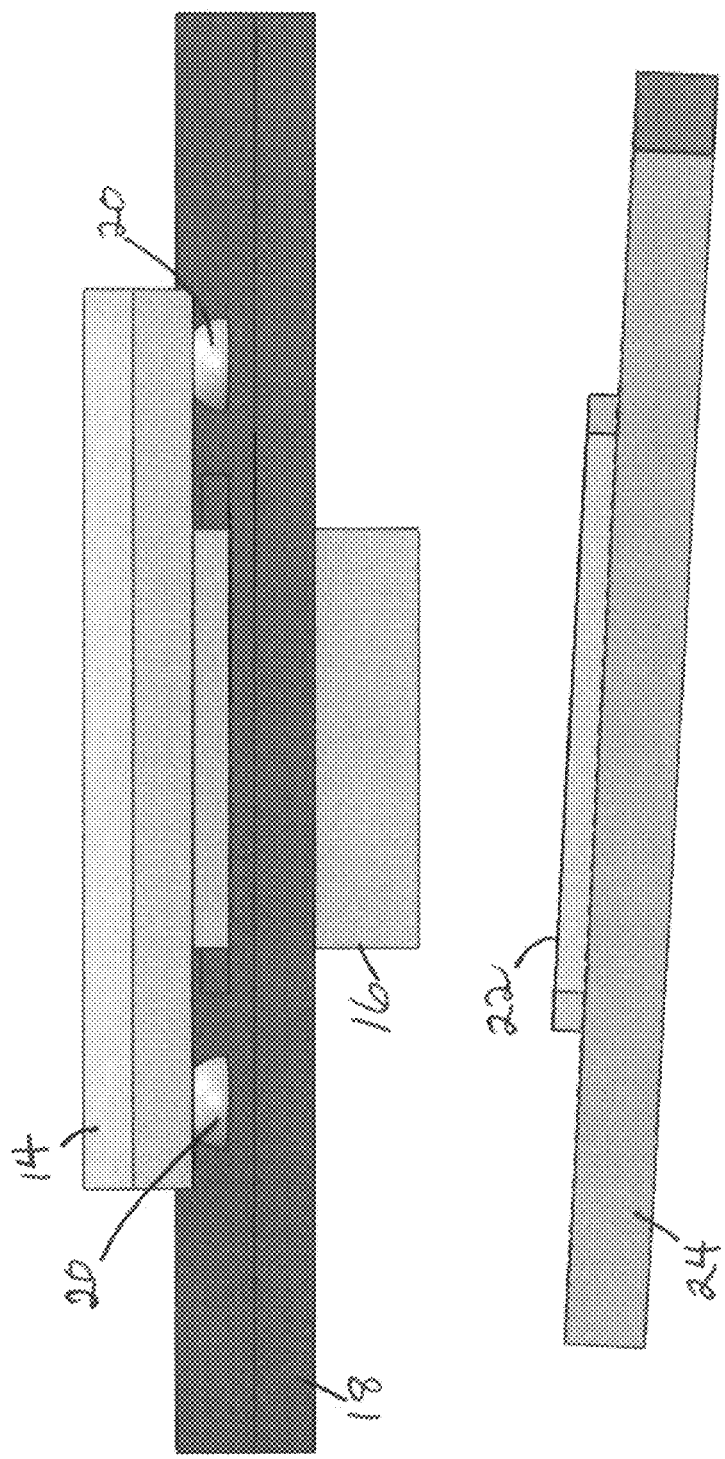

The system of the invention is illustrated in FIGS. 2a and 2b. A stamp holder 14 supports a stamp 16. As can be seen better in FIG. 2b, the stamp 16 extends through a slot in a top platform 18. The top platform 18 includes three balls 20 that are rigidly affixed to the top platform 18. The stamp holder 14 rests on the three balls 20. A substrate such as a glass slide 22 resides on a bottom platform 24. As the bottom, platform 24 is actuated to move upwardly, in this embodiment, the stamp 16 makes contact with the glass slide 22, tilts and loses contact with one of the balls 20. Friction at the stamp-glass interface ensures that the stamp does not slide on the glass surface. With further actuation of the bottom platform 24, the stamp 16 loses contact with the second and finally with the third ball 20. The stamp 16 then sits completely on the glass slide 22 surface, thereby ensuring a conformal contact between the two surfaces as shown in FIGS. 1(c) and 1(d). This technique ensures that in-plane motions are minimal during imprinting and the contact forces are not higher than the weight of the stamp 16. The invention thus enables passively aligning fragile surfaces parallel to one-another. It ensures repeatable alignment as a result of the deterministic kinematics of the three-ball arrangement.

The orientation and position of the stamp 16 is uniquely determined by the kinematics of the stamp/slide motion during the entire alignment process. To maintain a unique kinematics one must ensure that there is no slip and no rotation at the point of first contact between the stamp 16 and the glass slide 22. This can be achieved by selecting stamp/slide materials that have a sufficiently high coefficient of friction. Under this no-slip condition, the position of point A in FIG. 1(a) is determined completely by the displacement of the bottom platform 24 that holds the glass slide 22. Point A is the corner of the stamp 16 that is initially closest to the glass slide and makes first contact with the glass slide. After the glass slide makes first contact with the stamp, there are three distinct steps to the alignment process. These are:
(i) The stamp is in contact with two balls;
(ii) The stamp is in contact with only one ball;
(iii) The stamp loses contact with all three balls.

During all these three steps, point A on the stamp is always in contact with the glass slide. The orientation of the stamp for steps (i) and (ii) can be obtained from these kinematic conditions:
(a) Line joining two points that lie either both on the top or the bottom plane of the stamp is perpendicular to the stamp normal.
(b) The distance between point A and the ball that is still in contact with the stamp projected along the normal to the stamp is equal to the stamp thickness.

The orientation of the stamp for step (iii) is the same as that of the glass slide, i.e., the stamp and the slide are now parallel to each other.

Figure 3B:
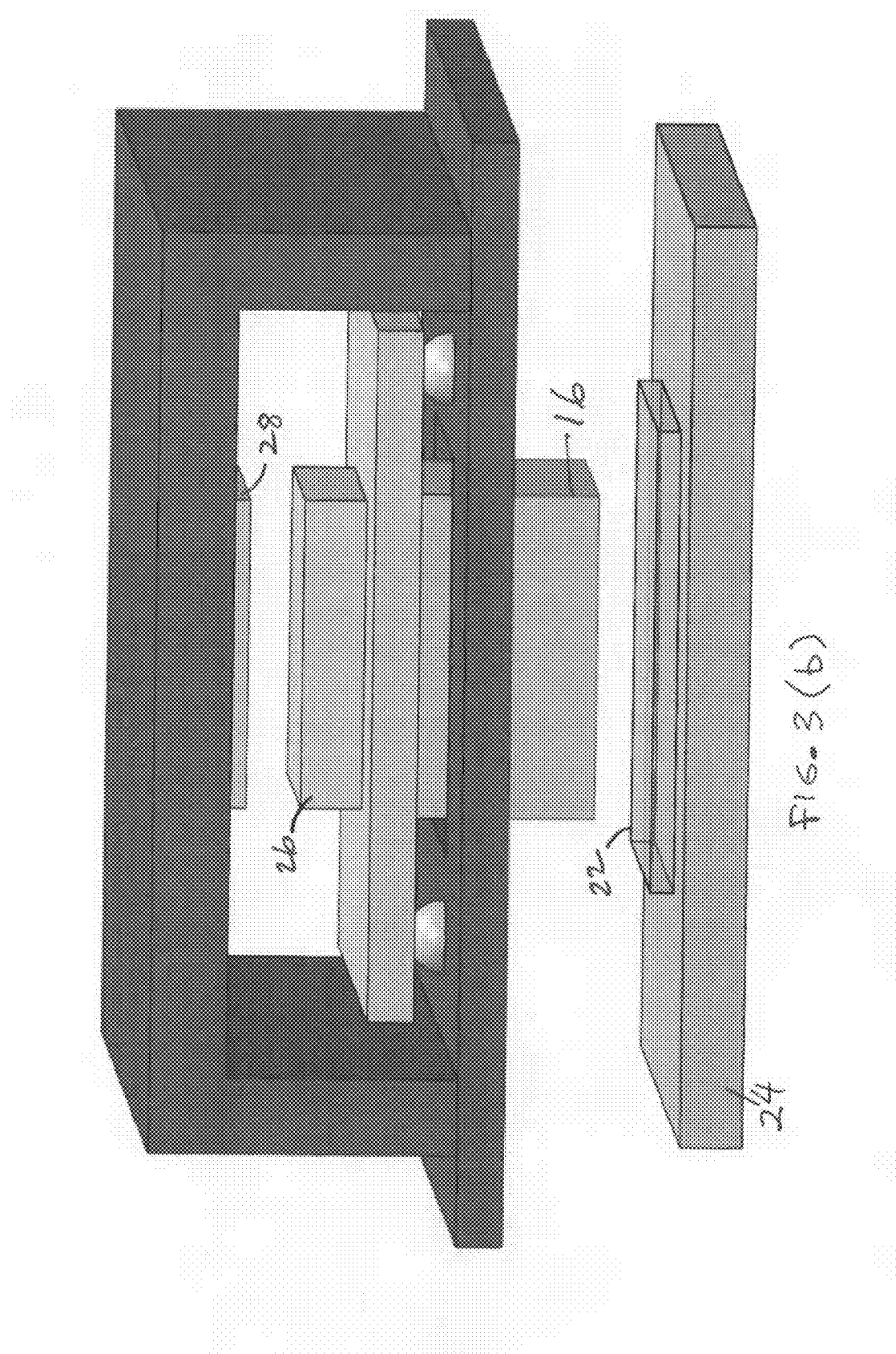

The contact forces during imprinting may be tuned to higher/lower values by applying an additional body force to the stamp/holder assembly as shown in FIGS. 3(a) and 3(b). For example, a permanent magnet 26 and art electromagnet 28 attached to the top of the stamp holder and a support would increase/decrease the net body force. This increase/decrease in the body force would correspondingly influence the contact forces. In the absence of such external body forces, the contact forces are driven by the self-weight of the stamp and the stamp holder.

It is recognized that modifications and variation of the present invention will be apparent of ordinary skill in the art and it is intended that all such modifications and variations be included within the scope of the appended claims.

What is claimed is:

1. Passive stamp alignment system comprising:
a stamp supported by a stamp holder;
a top platform including three non-collinear balls on a surface thereof and including an opening through which the stamp slidingly extends below the top platform for subsequent contact with a substrate as the stamp holder rests on the three balls on the surface of the top platform;
a bottom platform located below the stamp supporting the substrate to be aligned parallel to, and for conformal contact with, the stamp; and
wherein the system is capable of moving the top and bottom platforms towards one another so as to contact the substrate with the stamp whereby the stamp holder is lifted away from each of the balls in sequence as the substrate makes contact with the stamp resulting in alignment of the stamp and substrate parallel to each other and also resulting in the stamp and substrate being in conformal contact once the stamp holder is lifted from the last ball.

2. The system of claim 1 wherein a pair of magnets is affixed to the stamp holder and the top platform to apply a force on the stamp so as to tune contact forces.

3. The system of claims 1 or 2 wherein the top platform is stationary and the bottom platform is moveable.

4. The system of claims 1 or 2 wherein the top platform is moveable and the bottom platform is stationary.

5. The system of claims 1 or 2, wherein both the top platform and the bottom platform are moveable.

6. Passive alignment system comprising:
a stamp supported by a stamp holder;
a top platform including three objects on a surface thereof and including an opening through which the stamp slidingly extends below the top platform for subsequent contact with a substrate as the stamp holder rests on the three objects that provide point contact on the surface of the top platform;
a bottom platform located below the stamp supporting the substrate to be aligned parallel to, and for conformal contact with, the stamp; and
wherein the system is capable of moving the top and bottom platforms toward one another so as to contact the substrate with the stamp whereby the stamp holder is lifted away from each of the objects in sequence as the substrate makes contact with the stamp resulting in alignment of the stamp and the substrate parallel to each other and also resulting in the stamp and substrate being in conformal contact once the stamp holder is lifted from the last object.

7. The system of claim 1 wherein the stamp extends below the top platform through a slot in the platform.

8. The system of claim 1 wherein the substrate is a glass slide.

9. The system of claim 1 where the stamp includes a pattern of DNA nanowires to be replicated.

10. The system of claim 1 wherein the friction coefficient between the stamp and the substrate is selected to ensure that the stamp does not slide with respect to the substrate during alignment.

* * * * *